US006546066B2

United States Patent
Baliga et al.

(10) Patent No.: US 6,546,066 B2
(45) Date of Patent: Apr. 8, 2003

(54) INTEGRATED HEAD ASSEMBLY FOR A NUCLEAR REACTOR

(75) Inventors: Ravi Baliga, San Ramon, CA (US); Key Y. Choi, Burlingame, CA (US)

(73) Assignee: Advent Engineering Services, Inc., San Ramon, CA (US)

( * ) Notice: Subject to any disclaimer, the term of this patent is extended or adjusted under 35 U.S.C. 154(b) by 0 days.

(21) Appl. No.: 09/921,363

(22) Filed: Aug. 2, 2001

(65) Prior Publication Data

US 2003/0026376 A1 Feb. 6, 2003

(51) Int. Cl.$^7$ ............................................. G21C 19/00
(52) U.S. Cl. ...................... 376/263; 376/260; 376/261; 376/287
(58) Field of Search ................................. 376/260, 263, 376/287

(56) References Cited

U.S. PATENT DOCUMENTS

| | | | |
|---|---|---|---|
| 4,654,188 A | * 3/1987 | Hankinson et al. | ......... 376/260 |
| 4,666,657 A | 5/1987 | Altman | |
| 4,678,623 A | 7/1987 | Malandra et al. | |
| 4,828,789 A | 5/1989 | Hankinson et al. | |
| 4,830,814 A | 5/1989 | Altman | |
| 5,225,150 A | 7/1993 | Malandra et al. | |
| 5,715,288 A | 2/1998 | Matteson | |
| 5,737,378 A | * 4/1998 | Ballas et al. | ................. 376/287 |
| 5,742,652 A | 4/1998 | Hankinson et al. | |
| 5,930,321 A | 7/1999 | Harkness et al. | |
| 6,009,137 A | * 12/1999 | Matsumoto et al. | ........ 376/302 |
| 6,061,415 A | 5/2000 | Harkness et al. | |

OTHER PUBLICATIONS

Ball, M.G. et al., "Plant Equipment Improvements for Outage Optimization," *13th Korean Atomic Industry Forum/Korean Nuclear Society Annual Conference*, Seoul, Korea, 1998, pp. 483–495.

Kim, I.-Y., et al., "Integrated Head Assembly for Korean Next Generation Reactor," *Transactions of the 15th International Conference on Structural Mechanics in Reactor Technology*, Seoul, Korea, Aug. 15–20, 1999, pp. XI–315–321.

* cited by examiner

Primary Examiner—Charles T. Jordan
Assistant Examiner—R Palabrica
(74) Attorney, Agent, or Firm—Christensen O'Connor, Johnson, Kindness, PLLC

(57) ABSTRACT

An integrated head assembly (100) is disclosed for a nuclear reactor. The preferred integrated head assembly includes a lift assembly (150) that supports the reactor vessel closure head (90) and integrated head assembly for removal, a separate support structure (202) supported by a ring beam (151) that sits atop the reactor vessel closure head, a shroud assembly (200), a seismic support system (300), a baffle assembly (500), a missile shield (400), and a CRDM cooling system. The CRDM cooling system draws cooling air into the baffle assembly, downwardly past the CRDMs (96), outwardly to upright air ducts (600), upwardly to an upper plenum (680), and out of the assembly through the air fans (190).

12 Claims, 11 Drawing Sheets

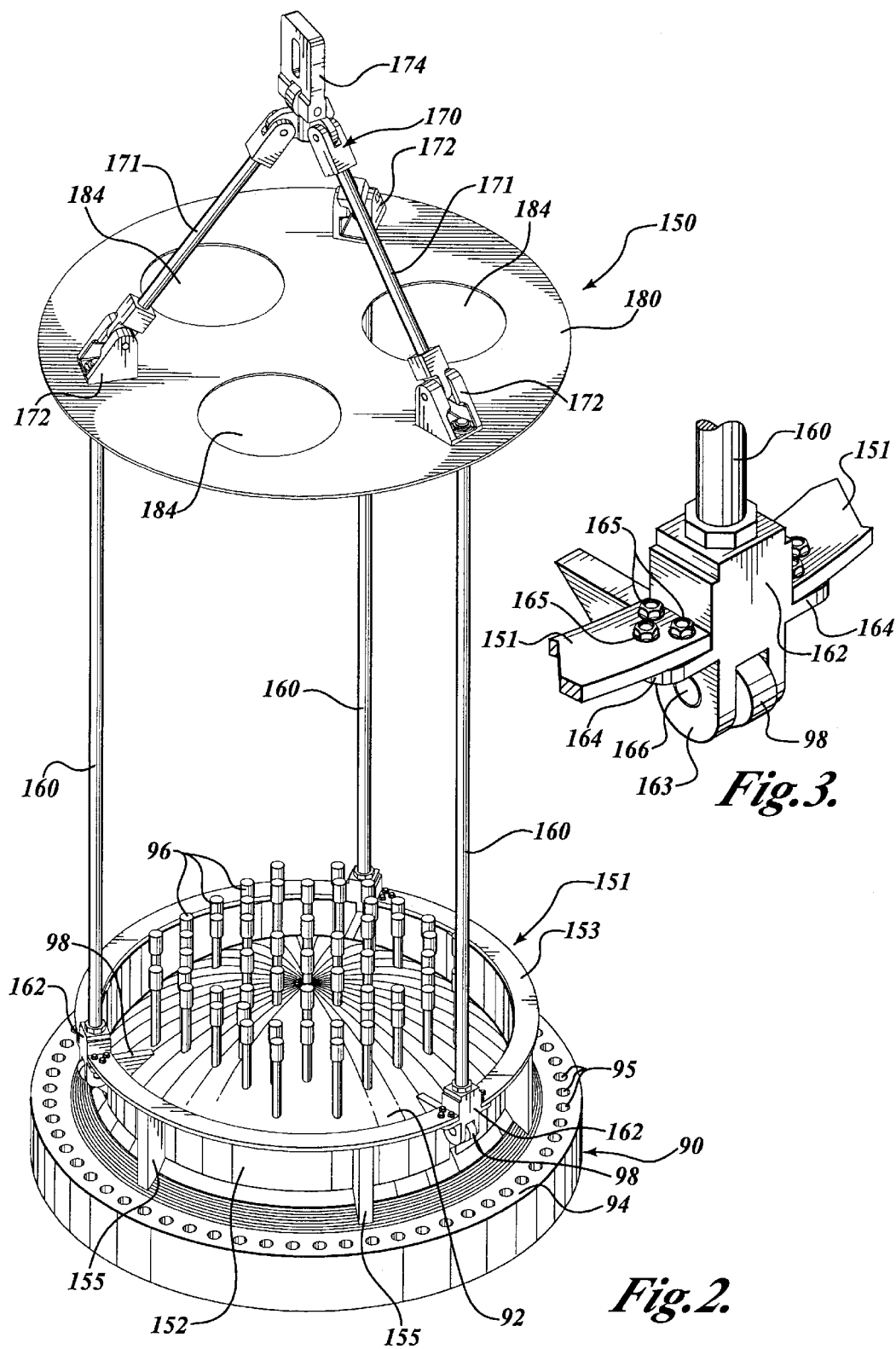

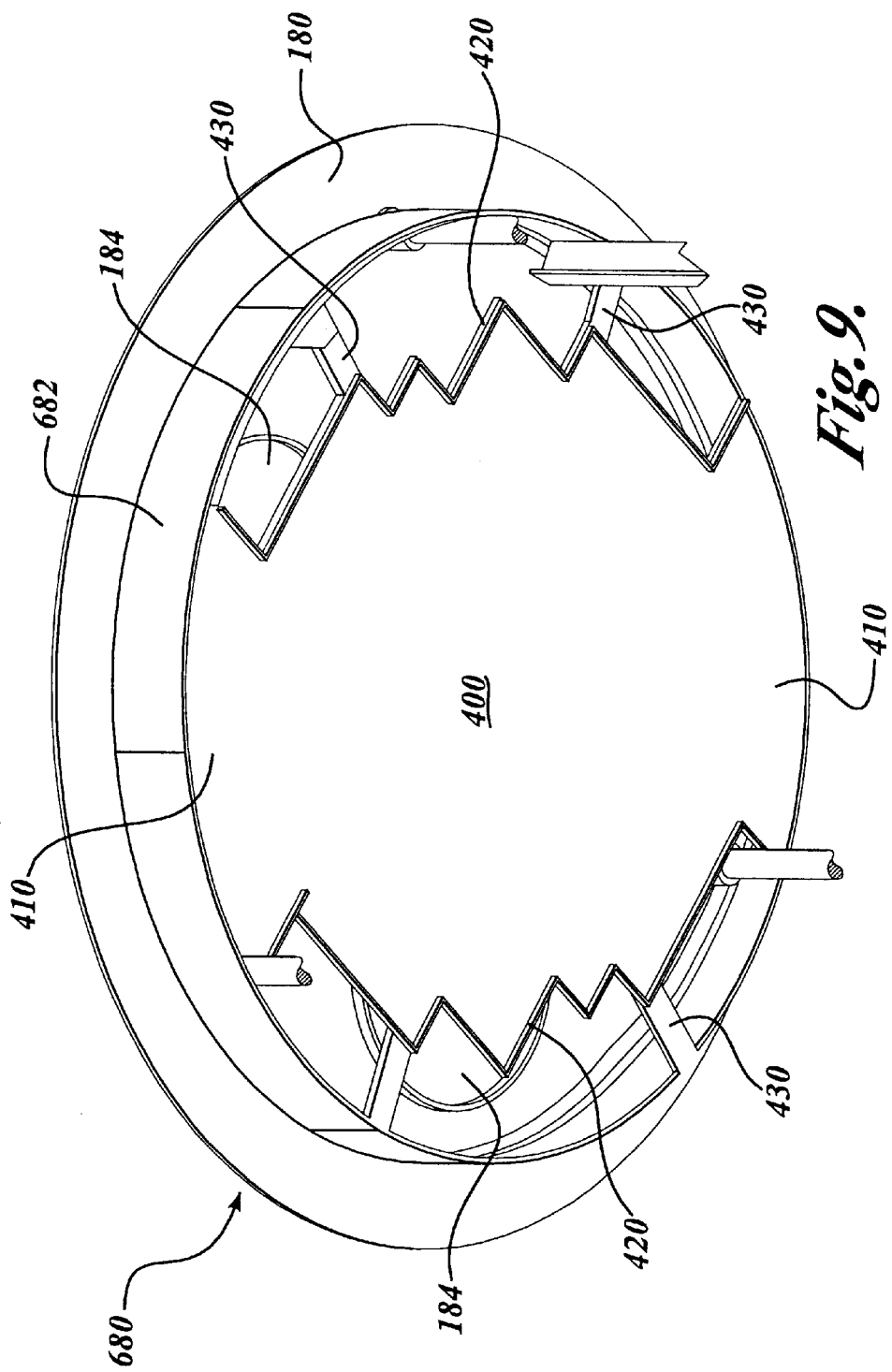

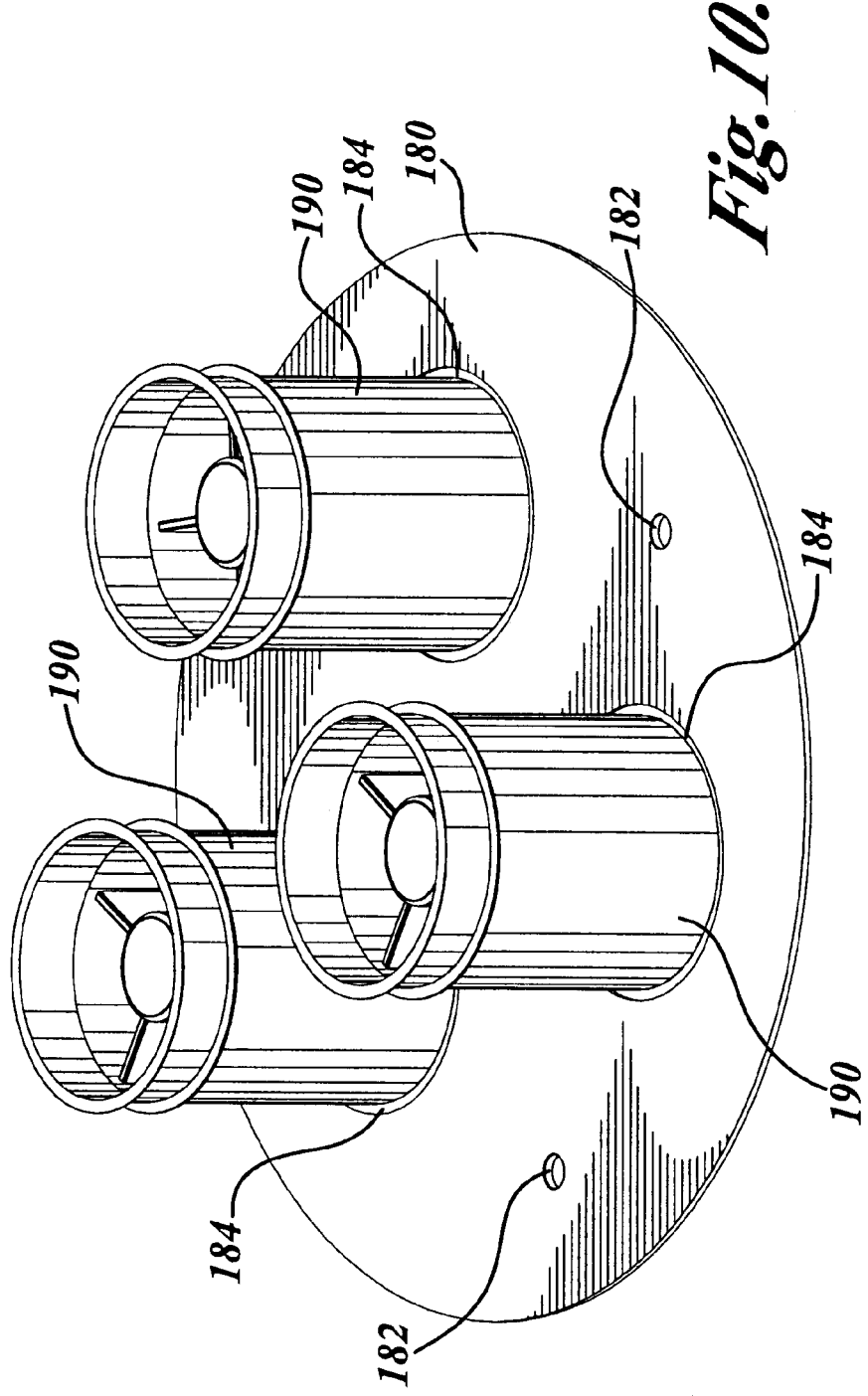

INTEGRATED HEAD ASSEMBLY FOR A NUCLEAR REACTOR

FIELD OF THE INVENTION

This invention relates to reactor vessel closure head assemblies and, in particular, to an integrated head assembly for a pressurized light water reactor.

BACKGROUND OF THE INVENTION

In a typical pressurized water reactor (PWR) power plant, various mechanical components and systems are installed on the reactor vessel closure head. These mechanical components and systems include, for example, a control rod drive mechanism (CRDM) cooling system, a reactor vessel closure head lift rig, CRDM seismic restraints, and a CRDM missile shield. Each of these components is typically designed and installed as a permanent fixture to perform designated functions during plant operation. However, during refueling of the reactor these components have to be disassembled in order to remove the reactor vessel closure head from the reactor vessel. These components are stored in designated storage areas, generally inside the reactor containment. Typically, in a PWR plant, a series of steps are followed before the reactor vessel closure head is removed from the reactor vessel. The operational steps that are performed prior to detensioning the reactor vessel closure head studs include some or all of the following:

Remove and store heavy concrete missile shields.

Remove and store the CRDM cooling ducts.

Remove the seismic restraints.

Disconnect and store the CRDM power and rod position indicator cables.

Install the reactor head lifting rig tripod.

Remove cable trays and cables running from the reactor head to the operating deck or walls.

Disconnect heated junction thermocouples, nuclear steam supply system instrumentation, monitoring system cables, and reactor head vent lines.

Install temporary lead shield blankets around the vessel closure head area.

The procedure also requires that the nuts and washers be removed from the reactor vessel closure head and placed in storage racks during preparation for refueling. The storage racks are then removed from the refueling cavity and stored at convenient locations inside containment prior to reactor vessel closure head removal and refueling cavity flooding. The above steps are then reversed while reinstalling the reactor vessel closure head and the related reactor systems.

Each of these steps contributes significantly to the total cost associated with refueling the reactor. The total costs include costs associated with personnel man-hours required to perform the refueling, power plant down time and consequent loss of electricity production, radiation exposure to personnel, and potential human errors. In addition, the various components that must be removed for refueling activities require a large amount of the limited storage space available inside containment and raise the risk of inadvertent contamination of work and storage areas.

Concepts and designs for integrating some of the reactor vessel closure head systems into a modular integrated head design have been proposed. For example, in U.S. Pat. No. 4,678,623 to Malandra et al., a modular head assembly is disclosed wherein vertical lift rods are attached to the reactor vessel lifting lugs, and a missile shield, seismic support platform, CRDM cooling system, and lift rig are supported by the lift rods above the reactor vessel closure head. Because most or all of the modular head assembly taught by Malandra et al. is supported by the lift rods, however, very large loads are concentrated at the clevis connection at the reactor vessel closure head lifting lugs, which may cause damage to the lifting lugs and/or the body of the reactor vessel closure head. In addition, very heavy components such as the missile shield and the fans are supported at the distal ends of three relatively long lift rods, resulting in an unstable structure that may subject the lift rods to undesirable compressive, bending and torsional stresses. Malandra et al. also does not provide a structure for putting a shroud around the CRDMs.

In U.S. Pat. No. 4,830,814, Altman discloses an integrated head package having a missile shield that is slidably mounted near the distal end of three lift rods connecting to the reactor vessel closure head lifting lugs. A shroud is shown disposed about the CRDMs. Similar to the apparatus disclosed by Malandra et al., however, the heavy missile shield and lifting rig are installed at the distal end of three elongate lift rods that are connected at their proximal end to the reactor vessel closure head lifting lugs. The Altman apparatus, therefore, will also produce relatively high local loads in the reactor vessel lifting lugs and head. Altman also does not disclose any system for cooling the CRDMs.

There is a need, therefore, for an integrated head assembly for a pressurized water reactor that can be removed from the reactor vessel integrally with the reactor vessel closure head, and that does not introduce undue local stresses at the reactor vessel closure head and lifting lugs.

SUMMARY OF THE INVENTION

The present invention is directed to an apparatus and method that satisfies this need. The apparatus includes an integrated head assembly for a pressurized light water nuclear reactor having a lift assembly that engages the lifting lugs on the reactor closure head. A support structure is provided above the reactor closure head with a shroud assembly and a baffle structure attached thereto. At least one upwardly extending duct for a CRDM cooling system is also provided. The apparatus includes a seismic support system and a missile shield attached to the support structure and disposed generally above the control rod drive mechanisms. At least one cooling air fan is fluidly connected to the duct.

In an embodiment of the invention the duct is cooperatively formed by the baffle and the shroud assemblies.

In an embodiment of the invention the support structure includes a ring beam with a number of saddle members that sits atop the reactor vessel closure head. The ring beam may be formed from three annular segments that are joined end to end. The support structure may also include a cylindrical support grid that extends upwardly from the ring beam. The shroud assembly may also comprise multiple axial segments, and provide air inlet port(s) for the air cooling system. In the preferred embodiment the air cooling system includes an upper plenum interconnecting three cooling fans and two vertical ducts.

An embodiment of a method for retrofitting a pressurized water nuclear reactor according to the present invention includes shutting down the nuclear reactor and removing the reactor vessel closure head from the reactor vessel and placing it on a reactor head stand. Lift rods are then attached to the lifting lugs on the reactor vessel closure head. An integrated head assembly module is then installed, the module including a ring beam that rests atop the reactor vessel closure head, a shroud assembly that sits atop the ring beam, and a baffle assembly attached to the shroud assembly. A seismic support system is then connected to the control rod drive mechanisms and a missile shield is installed above the CRDMs. A lifting assembly is then operatively attached to the lift rods above the missile shield, and the reactor vessel closure head is reinstalled on the reactor vessel.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a perspective view of the lift assembly portion of the integrated head assembly shown in FIG. 1;

FIG. 3 is a close-up fragmentary view of the connecting member of the lift rods shown in FIG. 2, shown connected to the ring beam;

FIG. 9 is a perspective view of the upper air plenum of the integrated head assembly shown in FIG. 1;

FIG. 10 is a perspective view of the fan support plate with the fans installed, of the integrated head assembly shown in FIG. 1;

DETAILED DESCRIPTION OF THE PREFERRED EMBODIMENT

Figure 1:
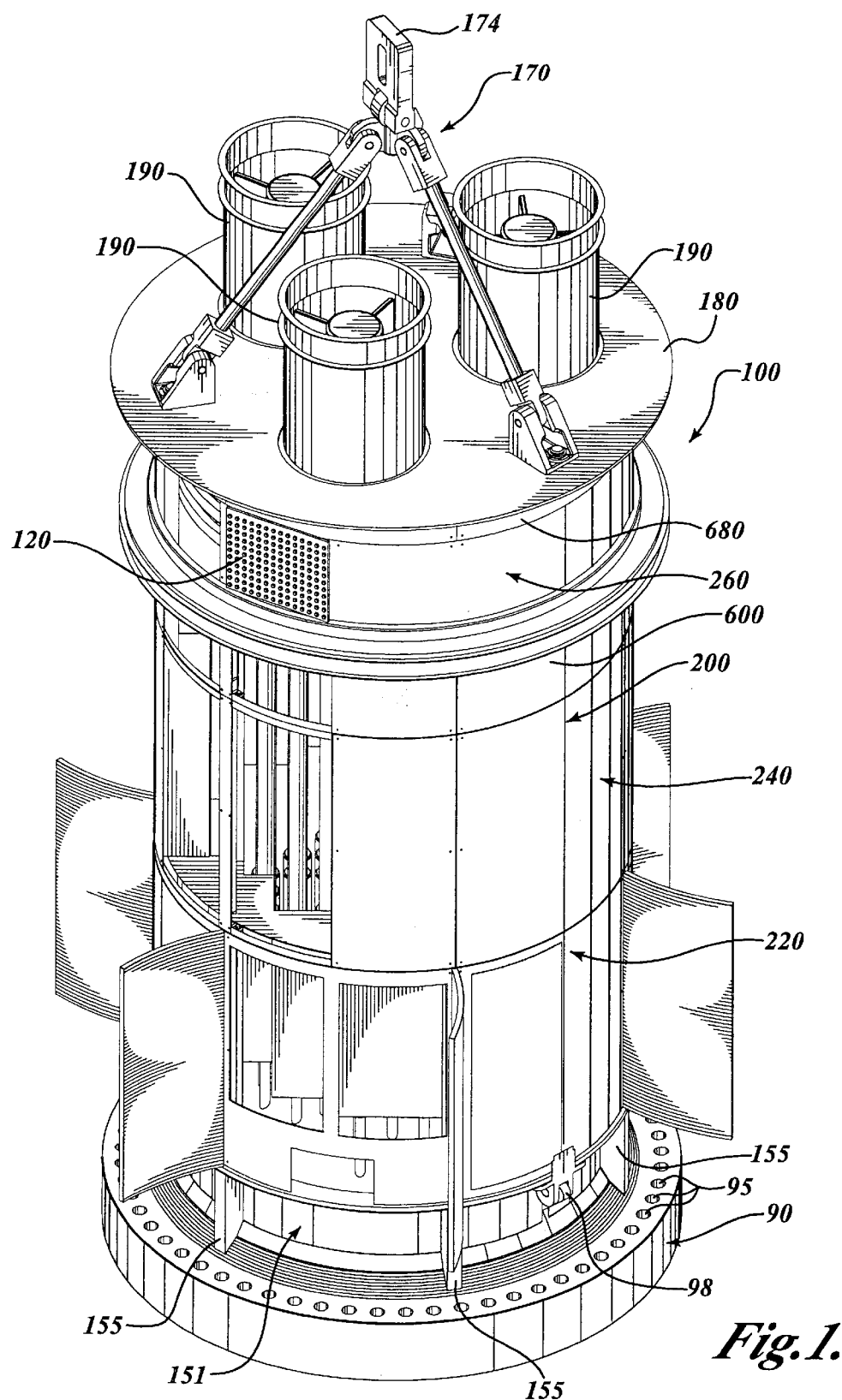
FIG. 1 is a perspective view of an embodiment of an integrated head assembly according to the present invention, shown installed on a reactor vessel closure head.

Referring now to the figures, an integrated head assembly 100 according to the present invention is shown atop a reactor vessel closure head 90 in FIG. 1. The reactor vessel closure head 90 is attachable to the top of a reactor vessel (not shown) and seals the reactor vessel, which contains the nuclear fuel (not shown). As seen more clearly in FIG. 2, the reactor vessel closure head 90 is a circular structure that typically includes a dome-shaped central portion 92 and an outer ring portion 94 having a plurality of stud mounting holes 95. The dome portion 92 supports a number of control rod drive mechanisms (CRDMs) 96 that extend vertically above the reactor vessel closure head 90 and pass through the head into the reactor vessel. The CRDMs 96 are electrically operated devices that control the vertical position of the control rods (not shown) inside the reactor vessel. CRDMs 96 are well-known in the art, and are therefore depicted in the figures in functional form, without showing the structural detail. For example, CRDMs generally include upwardly-extending guide tubes that, for clarity, are not shown in FIG. 2. The reactor vessel closure head 90 includes three integral lifting lugs 98 that are used to facilitate lifting the head for removal and replacement.

The preferred embodiment of the integrated head assembly 100 includes a lift assembly 150 that provides support structure for lifting the reactor vessel closure head 90, a cylindrical shroud assembly 200 that rests atop the reactor vessel closure head 90, a seismic support system 300 (see FIG. 12) that protects the CRDMs 96 and integrated head assembly 100 from seismically-induced loads, a missile shield 400 (see FIGS. 11A and 11B) that provides protection in certain accident scenarios wherein the CRDMs 96 and/or control rods are ejected, a baffle assembly 500 (see FIG. 8) for directing the flow of cooling air to the CRDMs 96, and a CRDM cooling system including cooling air ducts 600 connected through an upper air plenum 680 to cooling fans 190.

The primary components of the lift assembly 150 are shown in FIG. 2. The lift assembly 150 includes a bottom ring beam 151 that sits atop the reactor vessel closure head 90. The ring beam 151 of the preferred embodiment has a short, cylindrical lower portion 152 and a flange portion 153 that extends outwardly from the top edge of the cylindrical portion 152. A plurality of saddle members 155 are disposed peripherally around the ring beam 151, the saddle members 155 having a lower surface that generally conforms with the shape of the reactor vessel closure head 90, thereby distributing the weight of the integrated head assembly 100 over a larger portion of the reactor vessel closure head 90. In the preferred embodiment the ring beam 151 comprises three generally identical segments that are connected through the lift rod connecting members 162, as described below.

Three lift rods 160 extend vertically upwardly from the ring beam 151. Each lift rod 160 includes a connecting member 162 at one end having a clevis-type connector 163 that slidably engages one of the head lifting lugs 98. The connecting member 162 is attached to the head lifting lug 98 with a clevis pin 166. A detail of the connecting member 162 of the preferred embodiment is shown in FIG. 3. The connecting members 162 is positioned between ring beam 151 segments, and includes oppositely disposed horizontal flanges 164 that connect to the ring beam 151 with bolts 165, thereby interconnecting the ring beam segments and removably attaching the ring beam 151 to the reactor vessel closure head 90. Although the preferred embodiment utilizes three ring beam segments, it will be appreciated that other configurations are possible and contemplated by the present invention, including, for example, a unitary ring beam having cut out portions to accommodate connecting members.

The upper end of the lift rods 160 are threaded and extend through orifices 182 in a circular fan support plate 180 (see FIG. 10), where they are attached to the fan support plate 180 with the tripod base brackets 172 and/or other suitable connecting hardware. A lift tripod 170 is disposed above the fan support plate 180 and includes three rods 171, each rod 171 pivotally connected at one end to a tripod base bracket 172, and pivotally connected at the opposite end to a lift shackle 174. It will be appreciated that the lift assembly 150 permits the integrated head assembly 100 and the reactor vessel closure head 90 to be lifted as a single unit by an appropriate lifting mechanism, such as a hoist (not shown), acting on the lift shackle 174. It will be appreciated that the fan support plate 180 also functions as a spreader for the lift tripod 170. The three large apertures 184 through the fan support plate 180 are the outlet air ports for the upper air plenum 680 fluidly connected to the cooling fans 190 as described below.

Figure 4:
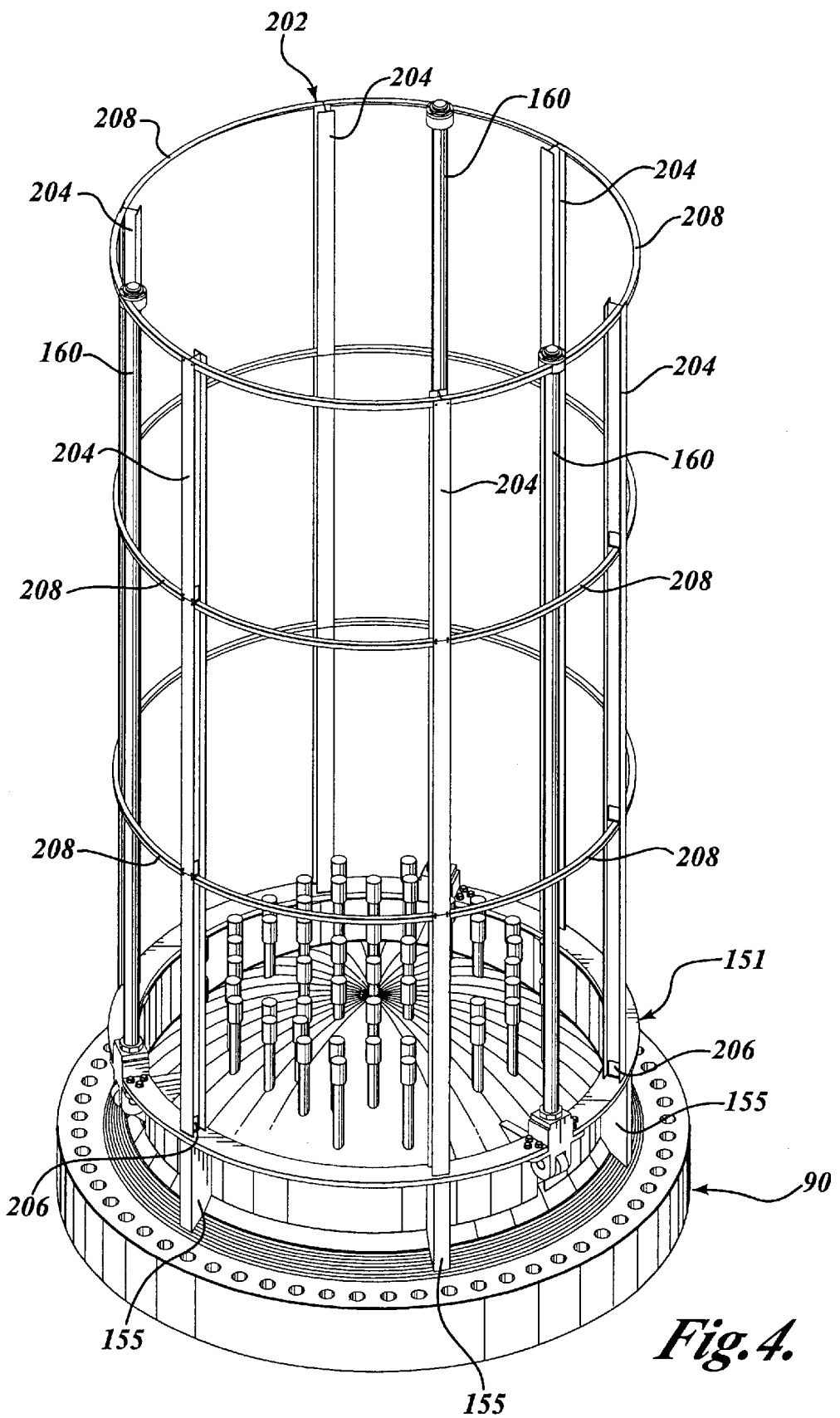
FIG. 4 is a perspective view of the support column assembly of the integrated head assembly shown in FIG. 1.

As seen most clearly in FIG. 4, a generally cylindrical support column assembly 202 is provided on top of the ring beam 151. The support column assembly 202 includes six support columns 204 that extend upwardly from the ring beam 151, each support column 204 preferably being positioned above one of the saddle members 155. The support columns 204 are attached to the ring beam 151 with a clip angle bolted connection 206. Curved transverse members 208 interconnect the support columns 204 at three vertically spaced locations. The support column assembly 202 provides a cylindrical grid support structure over the reactor vessel closure head 90 that supports the integrated head assembly components, and transfers the weight and dynamic loads from the integrated head assembly 100 to the ring beam 151. Although the preferred support structure has been described, it will be apparent to one of skill in the art that many variations in the support structure may be made without departing from the present invention. For example and not by way of limitation, more or fewer support columns 204 and/or transverse members 208 may be utilized, or the transverse members 208 may be replaced with hoop beams that encircle the support columns.

Figure 5:
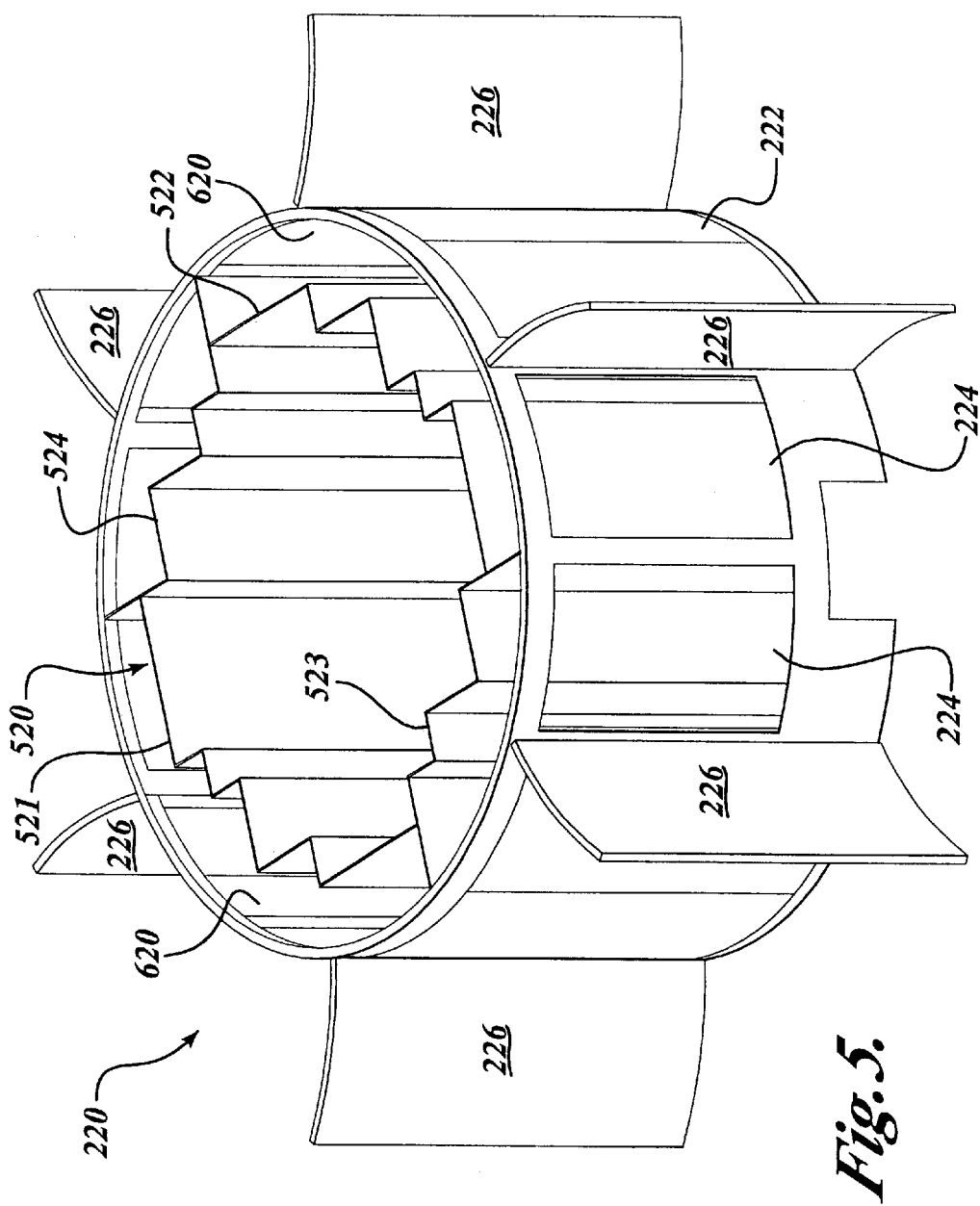
FIG. 5 is a perspective view of the bottom shroud portion of the integrated head assembly shown in FIG. 1.

The shroud assembly 200 of the preferred embodiment includes bottom shroud 220, a middle shroud 240 and an upper shroud 260 (see FIG. 1). The bottom shroud 220, shown in FIG. 5, is a cylindrical assembly that is installed at the lower end of the support column assembly 202, extending upwardly from the ring beam 151. The bottom shroud 220 includes an outer wall panel 222 that is preferably formed in multiple sections. The outer wall 222 includes access openings 224 that provide access to the interior of the shroud assembly 200, for example, to monitor and/or service the CRDMs 96. A plurality of doors 226 are attached at the access openings 224, whereby the access openings 224 can be closed, for example, during operation of the reactor and when access to the interior of the shroud assembly 200 is not otherwise required. It will be appreciated that although hinged attachments are shown, any other suitable closure system could be used, for example removable panels, sliding panels, and the like. The bottom shroud outer wall 222 and doors 226 may be made from any suitable material such as, for example, ASTM-A36 carbon steel. The thickness of the panel 222 and doors 226 are selected depending on the required level of radiation shielding that is desired. For example, in the preferred embodiment the panel 222 and doors 226 are ¼ inch thick if radiation shielding is not an issue, and 1½ inches thick if radiation shielding is desired.

A lower baffle portion 520 extends through the bottom shroud 220, comprising a left panel 521, a right panel 522, a forward panel 523, and a rearward panel 524. The baffle panels 521, 522, 523, and 524 are oriented approximately parallel to and generally surround the CRDMs 96. The lower baffle portion 520 defines a central air flow path for cooling air flow. The left and right panels 521, 522, cooperatively with a portion of the outer wall panel 222, form a pair of longitudinal channels 620 near the periphery of the integrated head assembly 100.

Figure 6:
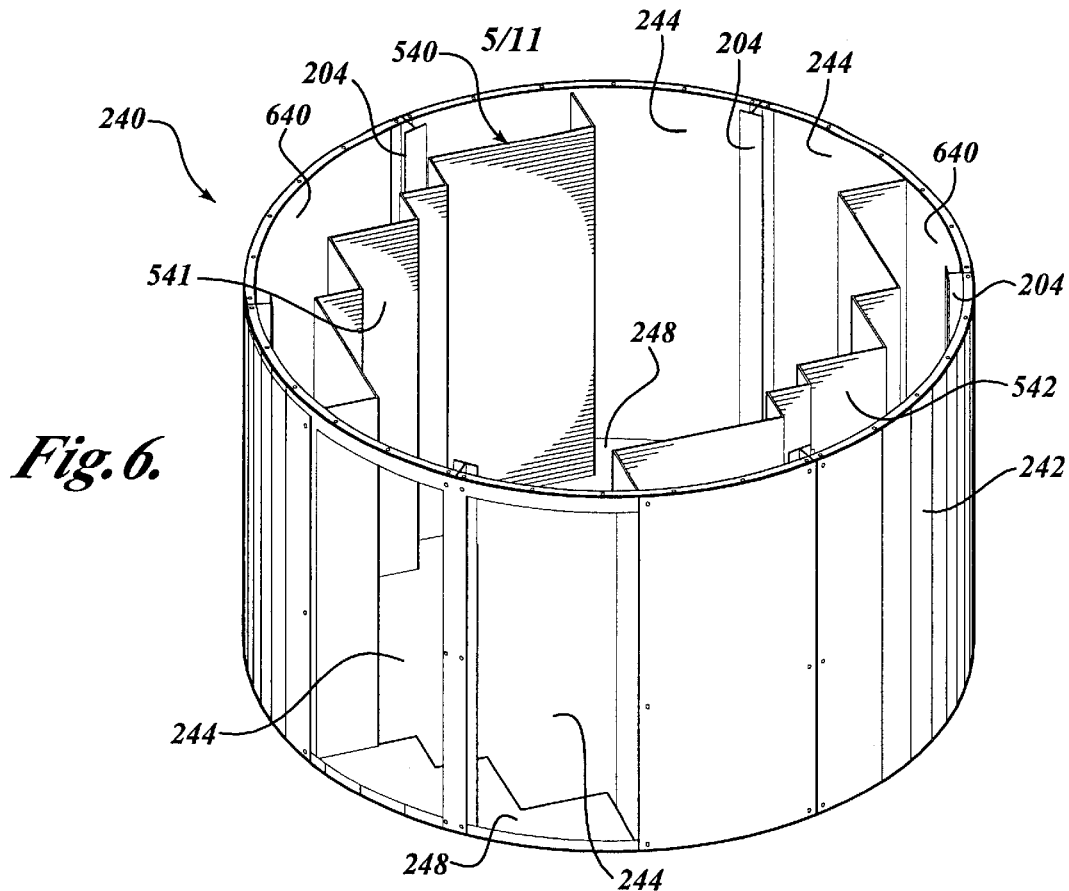
FIG. 6 is a perspective view of the middle shroud portion of the integrated head assembly shown FIG. 1.

Referring now to FIG. 6, a middle shroud 240 is aligned with the bottom shroud 220 and extends upwardly from the bottom shroud 220. Similar to the bottom shroud, the middle shroud 240 includes a multisection outer wall panel 242 that attaches to the support column assembly 202. Air inlet ports 244 are provided on opposite sides of the middle shroud 240, that permit ambient air to enter the shroud assembly 200 for cooling the CRDMs 96. A middle baffle portion 540 of the baffle assembly 500 extends vertically through the middle shroud 240. The baffle middle portion 540 includes a left panel 541 and a right panel 542 that each attach to the shroud outer wall 242, forming a pair of peripheral longitudinal channels 640, aligned with and vertically continuing the channels 620 formed in the bottom shroud 220. The baffle assembly middle portion 540 is preferably open at the oppositely disposed forward and rearward regions between the baffle left and right panels 541, 542, which openings are generally aligned with the shroud air inlet ports 244. Horizontal plates 248 extend inwardly from the bottom of the middle shroud 240 from the air inlet ports 244, such that air entering the air inlet ports 244 is directed to the interior of the baffle assembly 500 towards the CRDMs 96.

Figure 7:
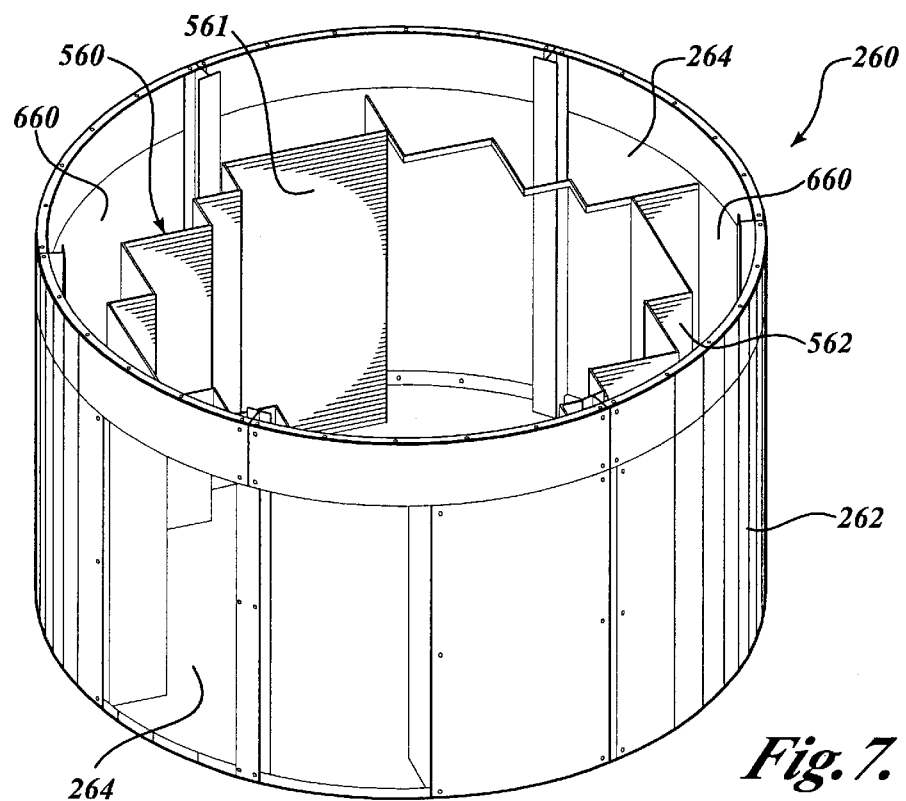
FIG. 7 is a perspective view of the upper shroud portion of the integrated head assembly shown in FIG. 1.

An upper shroud 260 is shown in FIG. 7. The upper shroud 260 extends upwardly from the middle shroud 240, and includes an outer wall 262 that attaches to the support column assembly 202. A baffle upper portion 560 of the baffle assembly 500 extends vertically through the upper shroud 260, including a left panel 561 and a right panel 562, aligned with the middle baffle portion 540. The baffle upper portion 560 and upper shroud outer wall 262 cooperatively form a pair of longitudinal channels 660 aligned with and continuing the middle section channels 640. The forward and rearward portions of the upper shroud 260 have apertures 264 to provide electric power and control access to the CRDMs 96 through a CRDM cable disconnect panel 120 (see FIG. 13). It will be appreciated that the shroud channels 620, 640, and 660 cooperatively form longitudinal cooling ducts 600 that a extend from near the reactor vessel closure head 96 upwardly substantially through the length of the shroud assembly 200.

Figure 8:
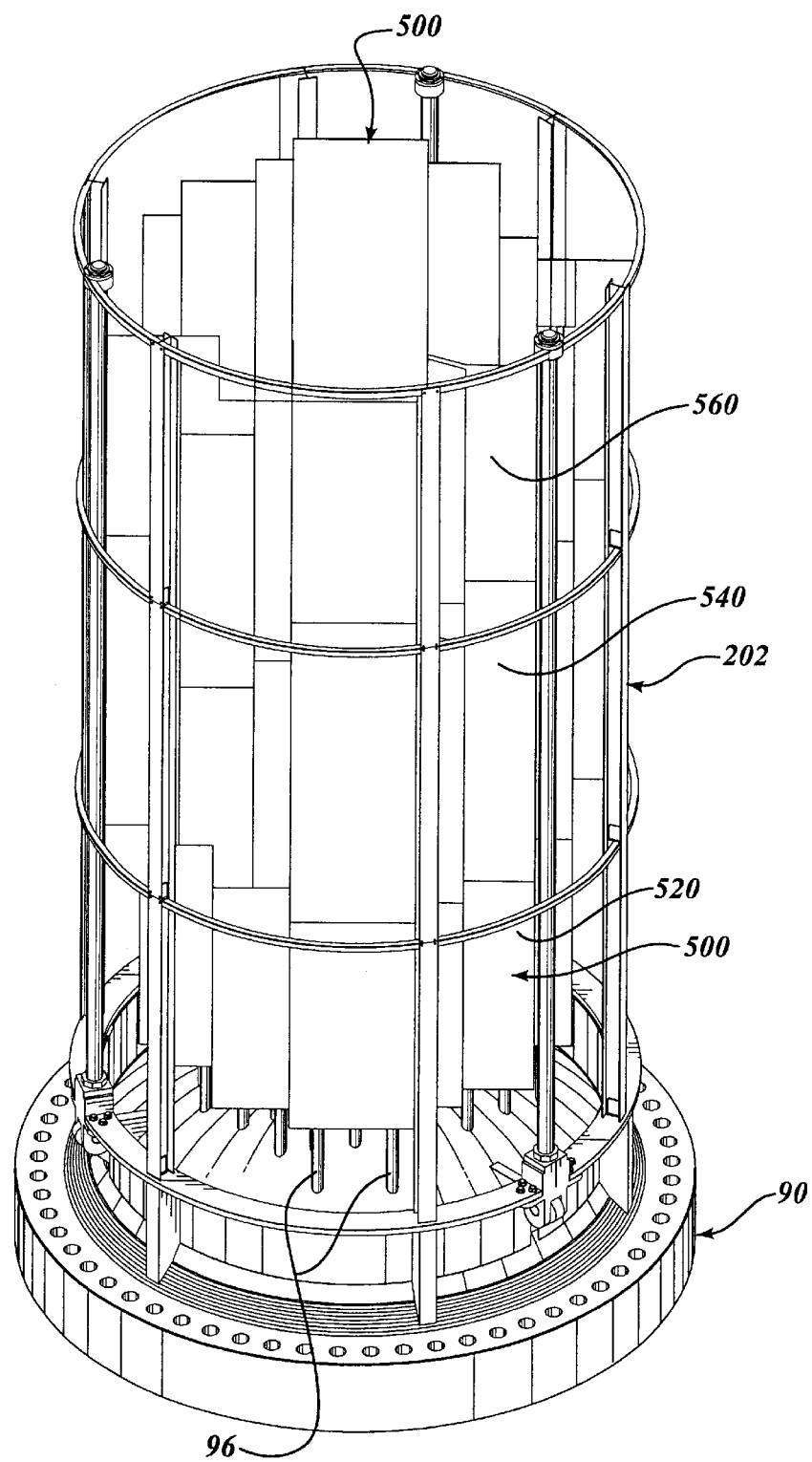
FIG. 8 is a perspective view of the baffle assembly portion inside the support column assembly of the integrated head assembly shown in FIG. 1.

A view of the baffle assembly 500 disposed within the support column assembly 202 is shown in FIG. 8, with the shroud outer walls 222, 242, 262 removed for clarity. The baffle structure 500 extends upwardly from near the reactor vessel closure head 90 and provides a flow path for cooling air to the CRDMs 96. A gap is provided between the reactor vessel closure head 90 and the baffle assembly 500 that functions as an air outlet port such that the cooling air flowing downwardly along the CRDMs 96 exits the baffle and flows outwardly toward the periphery of the integrated head assembly.

An upper air plenum 680, shown in FIG. 9, is provided at the top of the integrated head assembly 100. The upper air plenum 680 is a generally circular plenum that includes the fan support plate 180 having outlet ports 184 to the cooling air fans 190. The fan support plate 180 with three cooling air fans 190 installed, is shown in FIG. 10. The plenum lower panel comprising the missile shield 400 discussed in more detail below, and a vertical peripheral wall 682 is provided between the fan support plate 180 and the missile shield 400. The missile shield 400 includes left and right cutout portions 420 that are disposed over the cooling air ducts 600 and provide the inlet ports to the upper air plenum 680. In the preferred embodiment, the cooling air fans 190 draw air upwardly through the upper air plenum 680. In operation, therefore, the fans 190 draw air into the middle shroud inlet ports 244, downwardly along the CRDMs 96 in the baffle assembly 500, upwardly through the ducts 600 into the upper air plenum 680, and out of the integrated head assembly 100.

Figure 11B:
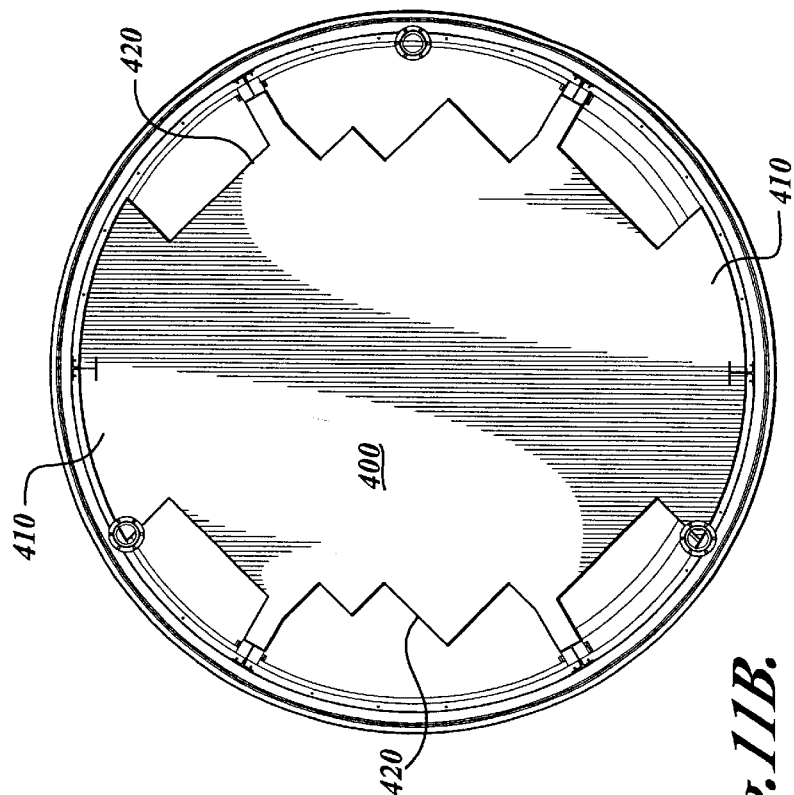
FIGS. 11A and 11B show the missile shield of the integrated head assembly shown in FIG. 1, FIG. 11A showing a plan view of the missile shield in isolation and FIG. 11B showing the missile shield installed in the support structure assembly.
Figure 11A:
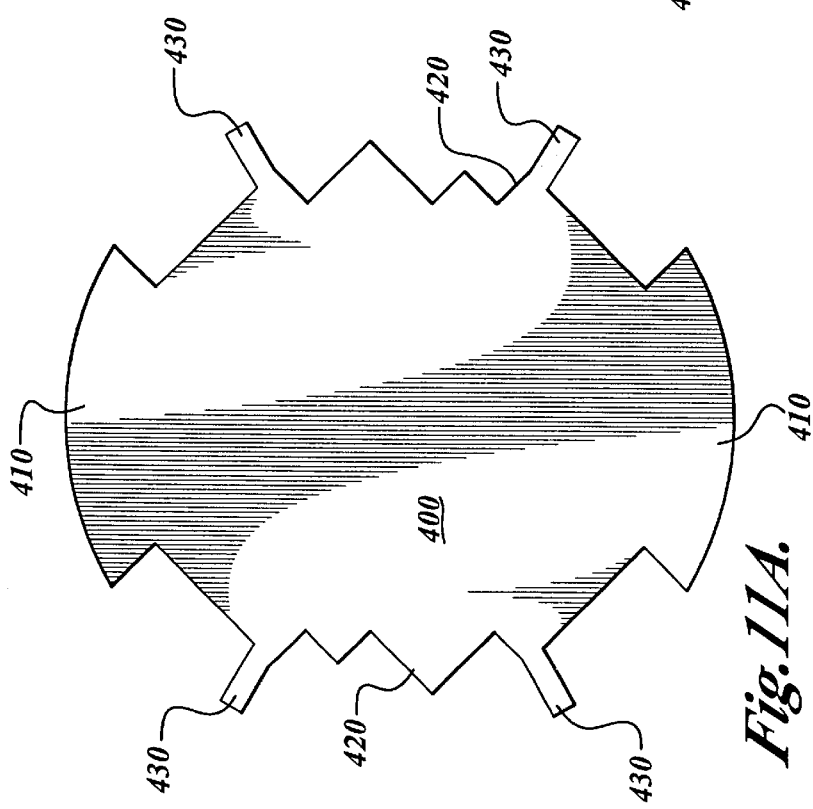

Referring now to FIGS. 11A and 11B, the missile shield 400 is provided above the CRDMs 96 near the top of the baffle assembly 500. The primary purpose of the missile shield 400 is to protect against the possible ejection of the CRDMs 96 or fuel rods in certain accident scenarios. The missile shield 400 may be made from any suitably strong material, and is preferably a steel panel having circular forward and rearward portions 410 and cutout left and right portions 420 that are shaped to accommodate the cooling air ducts 600 as discussed above. The missile shield 400 is supported by the support columns 204 and includes outwardly extending tab portions 430 to facilitate attachment to the support columns 204. FIG. 11B shows a plan view of the missile shield 400 installed in the integrated head assembly 100 (with some structural detail removed for clarity).

Figure 12:
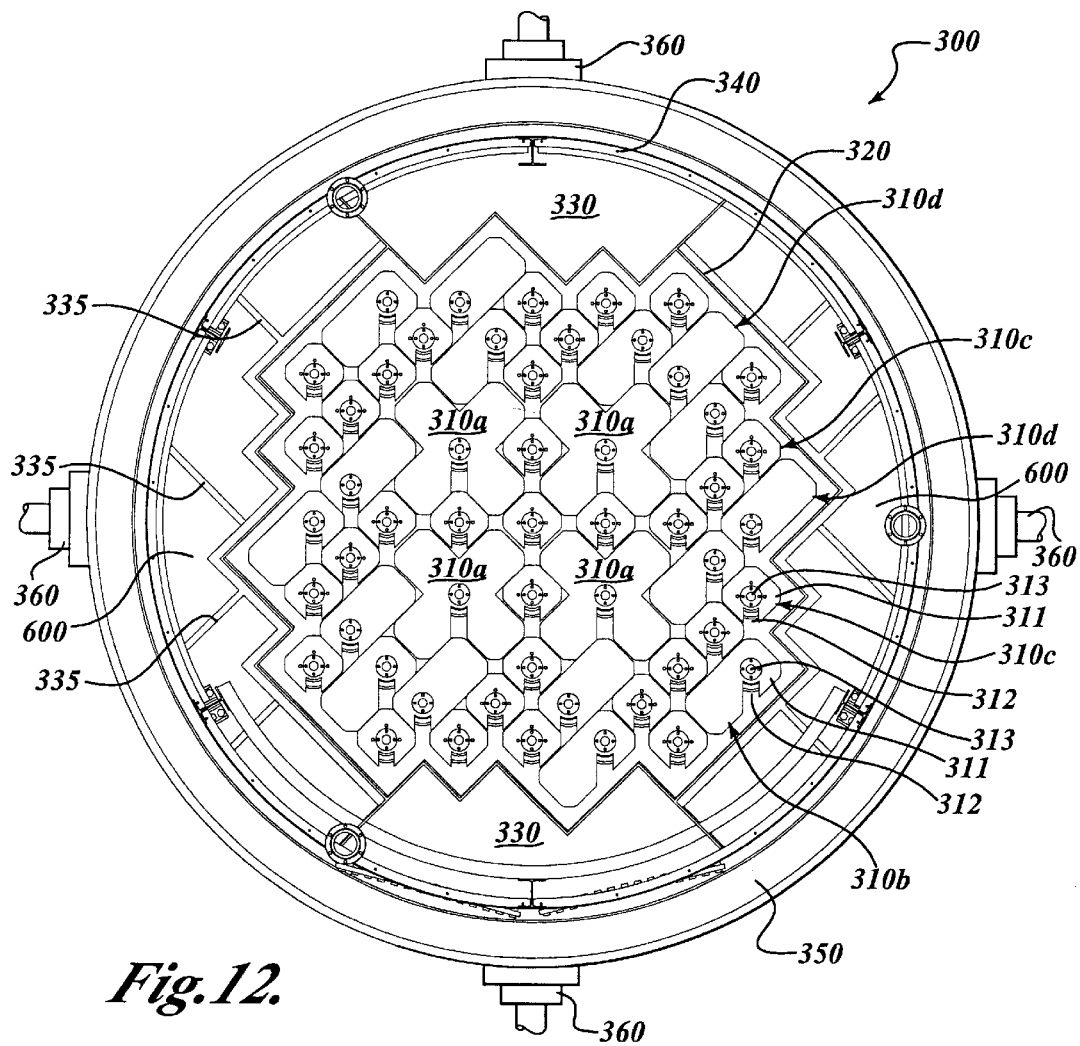
FIG. 12 is a plan view of the seismic support system of the integrated head assembly shown in FIG. 1.

A seismic support system 300 for the integrated head assembly 100 is shown in FIG. 12. The seismic support system 300 is designed to support the CRDMs 96 in a seismic event to ensure that the control rods are able to drop down into the reactor if it is necessary to shut the reactor down. The seismic support system 300 includes an array of seismic cap plates 310 of various shapes (310a, 310b, 310c, and 310d), each seismic cap plate attached to the upper end of a CRDM 96. The seismic cap plates 310 include a generally flat portion 311 with a notched out section 312 to accommodate electrical power and control cables. A hat-shaped recess or cavity 313 is formed at an intermediate portion of the seismic cap plate 310, and sized to accommodate the end of a CRDM 96. The CRDM 96 extends into the cavity 313 and is attached to the respective seismic cap plate 310. As shown in FIG. 12, the flat portions 311 of the cap plates 310 are approximately adjacent neighboring cap plates 310, such that the cap plates 310 cooperatively form a lateral support panel across the CRDMs 96.

A baffle stiffener ring beam 320 surrounds the seismic cap plate 310 array, and preferably a plurality of adjustable engagement mechanisms (not shown) are provided between the cap plate 310 array and the baffle stiffener ring beam 320, whereby only a slight gap is provided therebetween. A seismic ring beam 340, comprising a generally circular beam, surrounds the baffle stiffener ring beam 320, and is connected to the ring beam 320 with forward and rearward seismic stiffener plates 330 and left and right seismic stiffener beams 335. In the preferred embodiment, a bolt tensioner rail 350 is provided on the outer perimeter of the seismic ring beam 340 to accommodate a bolt tensioning/detensioning apparatus (not shown). A plurality of seismic restraints 360 connects the seismic ring beam 340 to a relatively stable anchor such as the reactor containment walls (not shown).

Figure 13:
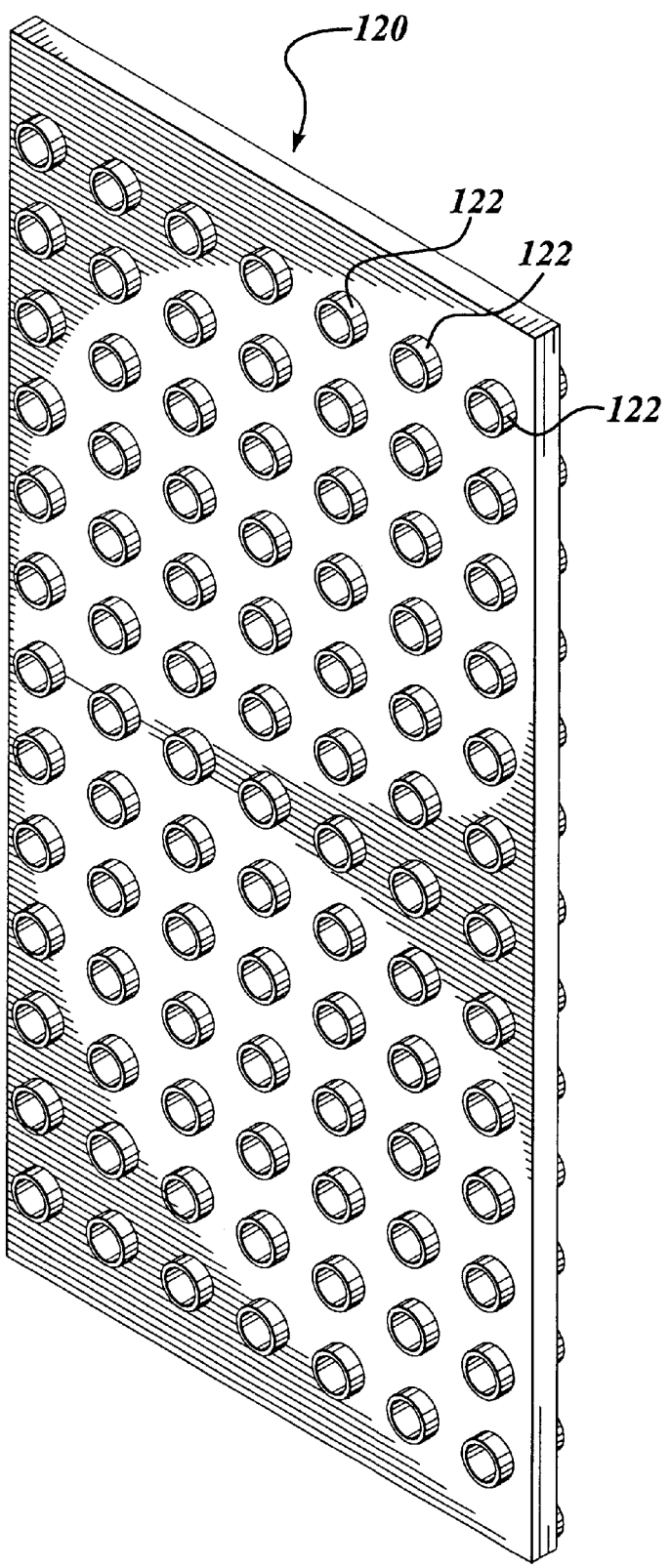
FIG. 13 is a perspective view of the CRDM cable disconnect panel that is installed in the upper shroud of the integrated head assembly shown in FIG. 1.

FIG. 13 shows the CRDM cable disconnect panel 120 discussed above, which is preferably installed in the upper shroud 260. The cable disconnect panel 120 provides an array of electrical connectors 122 providing a central location to disconnect the CRDMs 96 from their electric power and control systems prior to removal of the reactor vessel closure head 90. More than one cable disconnect panel 120 may be provided.

The integrated head assembly 100 of the present invention simplifies the removal and replacement of the reactor vessel closure head 90 for standard maintenance procedures, as well as for unscheduled outages, by integrating the lifting support, CRDM cooling system, missile shield, and seismic support into a single assembly that may be removed as a unit from the reactor vessel. In practice, to remove the integrated head assembly a polar crane hook or other appropriate lifting and moving mechanism is attached to the tripod assembly lift shackle 174, the CRDM cables are disconnected at the cable disconnect panel 120, the seismic restraints 360 are disconnected, and the reactor vessel closure head studs are loosened and removed. Additional site-specific steps well known in the art and not important to understanding of the present invention may also be required, such as moving one or more cable bridges away from the lift path of the head. The reactor vessel closure head can then be removed from the reactor vessel to permit the necessary maintenance procedures to be performed.

Although the preferred embodiment has been described in some detail, it will be readily apparent to one of skill in the art that many variations in the present invention may be made without departing from the present invention.

It will be appreciated that the present invention is amenable to retrofitting of existing nuclear power plants. No modifications to the reactor vessel closure head 90 would be required.

In a preferred method of retrofitting an existing plant, it is contemplated that the design, fabrication, and installation effort for the integrated head assembly 100 of the present invention would be performed over a period of approximately 24 calendar months. The integrated head assembly 100 installation would preferably be performed during a refueling outage of the plant, such as are typically scheduled every 18 months. Accordingly, the design/fabrication/installation process needs to be scheduled based on the Plant refueling schedule. The integrated head assembly shroud assembly 200 and associated components may be fabricated and shipped in three modules. The first module comprises the bottom ring beam 151, the bottom shroud 220, the baffle lower portion 520 and other appurtenances associated with the bottom shroud 220. The second module would comprise the middle shroud 240, the baffle middle portion 540, including the cooling air inlets, and other associated appurtenances. The third module would include the upper shroud 260, baffle upper portion 560, partial air inlet, partial assembly of the CRDM 96 seismic support system 300, and related head area cable support systems and wires in pre-routed condition, the cable disconnect panel(s) 120, the missile shield 400, the cooling fans 192, and other associated appurtenances. It is contemplated, although clearly not critical to the present invention, that the three lift rods 160 and the lift tripod 170 would be shipped as separate items.

The assembly of these components would preferably be accomplished while the reactor vessel closure head 90 is resting on a reactor head stand inside the containment. In a typical installation, the existing rig assembly would first be disassembled from the reactor vessel closure head 90. The three lift rods 160 are then attached to the three lift lugs 98 on the reactor vessel closure head 90. Temporary supports are preferably provided at the top of the lift rods 160 to hold them in place. Assembly of integrated head assembly components is accomplished starting from the bottom of the integrated head assembly (i.e. near the reactor vessel closure head 90) and continuing on in upward direction. The first module is inserted through three lift rods 160 and the bottom ring beam 151 is attached to the connecting members 162 of the lift rods 160. Once the lower shroud 220 is in place, the second module is lowered through the lift rods 160 and bolted to the bottom shroud 220 at the transverse members (i.e. ring angles) 208 and at the support columns 204. For accessibility for bolted connections, some or all of the outer wall panel 242 of the middle shroud 240 may be removed from the shroud.

It is possible that the elevation of the top of the second module is very close to the elevation of the CRDM seismic cap plates 310. In such cases, install all CRDM seismic cap plates 310 on all CRDMs 96 prior to lowering the third module over the lift rods 151. In the next step of this preferred method, lower the third module through three lift rods 151 and attach it to the top of the middle shroud 240 by bolts at the transverse members 208 as well as at the support columns 204. Again for accessibility for bolted connections, some or all of the outer wall panel 262 of the upper shroud 260 may be removed from the shroud. The installation of the CRDM seismic support system 300 may be completed at this time, excepting attachment of the seismic restraints 360. The seismic restraints 360 are preferably installed when the integrated head assembly is in place atop the reactor vessel. After the third module is assembled and installed, the missile shield 400 may be installed along with the cooling fan support plate 180 including the rest of the upper air plenum 680, the cooling fans 190, and the lift tripod 170.

After the cooling fan base is installed, the refueling disconnect panels may be installed near the bottom surface of the cooling fan support plate 180. The retrofit is completed with the assembly of miscellaneous non-structural elements. After the assembly is complete, the whole integrated head assembly 100 with the reactor vessel closure head 90 is lifted and held in a lifted position for some time by the containment polar crane and then put back on the head stand. At this time all component connections are checked once again for their effectiveness. When it is ready to install the reactor vessel closure head 90 back on the reactor vessel, the entire integrated head assembly 100, with the reactor vessel closure head 90 is lifted from the head stand and moved over the reactor vessel and lowered slowly until the head is properly aligned and resting on the reactor vessel, and the assembly is attached to the reactor vessel. After the reactor vessel closure head studs are properly torqued, the seismic restraints 360 are attached to the integrated head assembly 100 on one side and to the refueling walls on the other side. After the integrated head assembly is installed it is contemplated that airflow test would be performed to ensure proper operation of the cooling fans 190 and the entire CRDM cooling system.

It will be apparent to one of skill in the art that other assembly methods are possible although less preferred, including, for example, installing or partially installing the integrated head assembly to the reactor vessel closure head while it is attached to the reactor vessel, or installing the integrated head assembly to the reactor vessel closure head utilizing more smaller modules, or fewer larger modules. In particular it is contemplated that the integrated head assembly 100 could be substantially completely assembled prior to installing it on the reactor vessel closure head.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An integrated head assembly for a nuclear reactor having a reactor vessel closure head with a dome-shaped portion and three lifting lugs, wherein the reactor vessel closure head supports a plurality of control rod drive mechanisms, the integrated head assembly comprising:

(a) a lifting assembly attached to the reactor vessel closure head lifting lugs, the lifting assembly comprising i) a ring beam having a generally upright cylindrical lower portion having a top edge and an upper flange portion that extends outwardly from the top edge of the cylindrical lower portion, the ring beam coaxially disposed on top of the reactor vessel closure head;

ii) three vertical lift rods, each lift rod having a proximal end comprising a connecting member that engages one of the lifting lugs and the ring beam, and a distal end;

iii) a spreader plate attached to the distal end of the lift rods; and iv) a tripod releasably attached to the spreader plate;

(b) a cylindrical support structure extending upwardly from the ring beam;

(c) a shroud assembly attached to the support structure, the shroud assembly encircling the control rod drive mechanisms;

(d) a baffle assembly attached to the support structure and disposed between the shroud assembly and the control rod drive mechanisms;

(e) a control rod drive mechanism cooling system comprising a plurality of fans and a plurality of vertically extending ducts, the ducts each having an air inlet end disposed near the reactor vessel closure head and an outlet end disposed above the inlet end and fluidly connected with at least one of the fans; and (f) a missile shield disposed above the control rod drive mechanisms.

2. The integrated head assembly of claim 1, wherein the plurality of ducts is cooperatively defined by the baffle assembly and the shroud assembly.

3. The integrated head assembly of claim 1, wherein the ring beam further comprises a plurality of saddle members circumferentially spaced around the ring beam, wherein the saddle members have a lower surface shaped to approximately conform to a part of the dome-shaped portion of the reactor vessel closure head.

4. The integrated head assembly of claim 1, wherein the ring beam comprises three annular-segment-shaped members joined.

5. The integrated head assembly of claim 1, wherein the cylindrical support structure comprises a plurality of vertical beam members that are attached to the ring beam, and a plurality of vertically spaced apart ring angles that interconnect the plurality of beam members.

6. The integrated head assembly of claim 1, wherein the shroud assembly comprises a first shroud section extending upwardly from the ring beam, a second shroud section extending upwardly from the first shroud section, wherein the second shroud section includes at least one air inlet port in fluid communication with the baffle structure, and a third shroud section extending upwardly from the second shroud section, the third shroud section having at least one aperture providing access to an upper portion of the control rod drive mechanisms.

7. The integrated head assembly of claim 6, wherein the first shroud section further comprises at least one access aperture that provides access to the interior of the shroud assembly and at least one door for closing the at least one access aperture.

8. The integrated head assembly of claim 1, further comprises an upper plenum fluidly connecting the plurality of ducts with the plurality of fans.

9. The integrated head assembly of claim 8, wherein the fans are oriented to draw air upwardly through the upper plenum such that air is drawn into the baffle structure through the shroud air inlet port, downwardly over the control rod drive mechanisms, upwardly through the ducts, and into the upper plenum and through the fans.

10. The integrated head assembly of claim 8, wherein the upper plenum comprises the spreader plate disposed above and generally parallel to the missile shield, the missile shield, and a peripheral wall disposed between the spreader plate and the missile shield.

11. The integrated head assembly of claim 1, wherein the missile shield is a contiguous sheet of metal without any holes and having a perimeter shaped to accommodate the plurality of ducts.

12. The integrated head assembly of claim 1, further comprising a control rod drive mechanism disconnect panel disposed near the top of the shroud assembly, the disconnect panel comprising a plurality of electrical connectors.

* * * * *